Patented Sept. 30, 1941

2,257,380

UNITED STATES PATENT OFFICE 2,257,380

REFRACTORY BODY

Leonard H. Hepner, Trenton, N. J., assignor to Crane Co., Chicago, Ill., a corporation of Illinois No Drawing. Application January 21, 1939, Serial No. 252,207

3 Claims. (Cl. 106—45)

This invention relates to the manufacture of refractories, non-vitrifying clays, earthernware bodies, and more particularly to that class of ceramic bodies which are coated with engobe and/or glaze, such as urinal stalls, laundry tubs, baths and the like.

Heretofore, in the manufacture of glazed ceramic products, increased craze resistance of the glaze coating has been claimed as being due to the ease of applying a uniform and thin coating of glaze on the ware in the biscuit or dried state and efforts were expended to produce a pore structure in the ware capable of uniform absorption of moisture from the glaze.

It is an object of this invention to provide a refractory body which, when coated with a glaze, has a remarkable and unexpected increase in the craze resistance of the ware due to a great reduction in the moisture expansion and an increase in the contraction of the fired body.

In order to accomplish the new and unobvious results of this invention, use is made of raw or generally calcined pyrophyllite in the refractory body during the course of its manufacture. It is realized that pyrophyllite has been used in wall tile, dinnerware, vitreous, semi-vitreous and other white burning clay compounds by Sproat in United States Patent No. 1,984,163 and by Curtis in United States Patent No. 1,768,545, to strengthen the finished products mechanically.

The usual method of increasing craze resistance has been to adjust the composition of the body so as to cause its contraction while cooling after being fired to be greater than the contraction of the glaze. By the means mentioned, the glaze in the finished ware is under compression and the forces set up by the moisture expansion of the body must overcome the compression before the glaze will fail or craze. By using a quantity of pyrophyllite in the composition of the refractory body, as hereinafter explained, a longer and more controllable firing or vitrification range results due to the partial or total elimination of flint, with much greater fired strength and much lower moisture expansion.

For the purposes of this invention a refractory composition comprising the following ingredients has given satisfactory results when fired in tunnel and periodic type kilns:

|  | Wet basis | Dry basis |
|---|---|---|
|  | Percent | Percent |
| Clay | 30 | 33.3 |
| Grog | 40 | 44.5 |
| Pyrophyllite | 20 | 22.2 |
| Water | 10 | ---------- |

It should be clearly understood that the above percentages are not given to define precisely the scope or application of my invention, but that the percentages and materials may be varied within the scope of the claims appended hereto without departing from the spirit of the invention. The range of ingredients which may successfully be used in accomplishing the desired results of my invention has been found to be:

|  | Per cent |
|---|---|
| Clay | 15 to 80 |
| Grog | 10 to 85 |
| Pyrophyllite | at least 10 |
| Flint | 0 to 20 |
| Metallic oxide | 0 to 5 |

The clay mentioned above may be a mixture of clays taken from various localities but, for the best results in obtaining craze resistance and resistance to thermal shock as has been demonstrated in actual tests, all the clays may be grouped under the classification of plastic siliceous fire clays or plastic siliceous refractory clays. The grog or pre-fired clay may be made from the same or similar clays, with or without pyrophyllite, after having been fired, by crushing or grinding to a desired fineness, as for example to 150 mesh. Pyrophyllite is a hydrous aluminum silicate which is chemically expressed as $Al_2O_3 \cdot 4SiO_2 \cdot H_2O$ and is preferably pulverized to pass a 150 mesh screen before being added to the mix in the clay and/or in the grog. The mixture may be prepared in the usual manner for casting or for pressing into molds, after which it may be dried, slipped, glazed and fired as is commonly done by those skilled in the art.

It will be understood that my invention may be variously modified and embodied within the scope of the appended claims.

I claim:

1. In a semi-porcelain glazed sanitary ware comprising approximately 15 to 80% of clay of the plastic siliceous refractory type, approximately 10 to 85% of grog made from the said clay, at least 10% of the total composition being pyrophyllite, the usual amounts of flint not to exceed 20% and metallic oxide not to exceed 5%, the resultant mixture being characterized by a substantial decrease in moisture expansion and increased craze resistance.

2. A semi-porcelain glazed ware of the character described comprising a clay of the plastic siliceous refractory type and pyrophyllite, the resultant ware possessing the properties of low moisture expansion and increased craze resistance.

3. The process of making a semi-porcelain glazed ware of the character described which comprises substantially the steps of adding pyrophyllite to a clay of the plastic siliceous refractory type, preparing a grog therefrom, mixing with water, forming the resultant mixture in a mold, allowing same to dry, applying a glaze thereto and firing.

LEONARD H. HEPNER.